E. DEGRÉMONT.
FRAME FOR BEET HARVESTING MACHINES.
APPLICATION FILED AUG. 21, 1913.
1,249,911.
Patented Dec. 11, 1917.
2 SHEETS—SHEET 1.
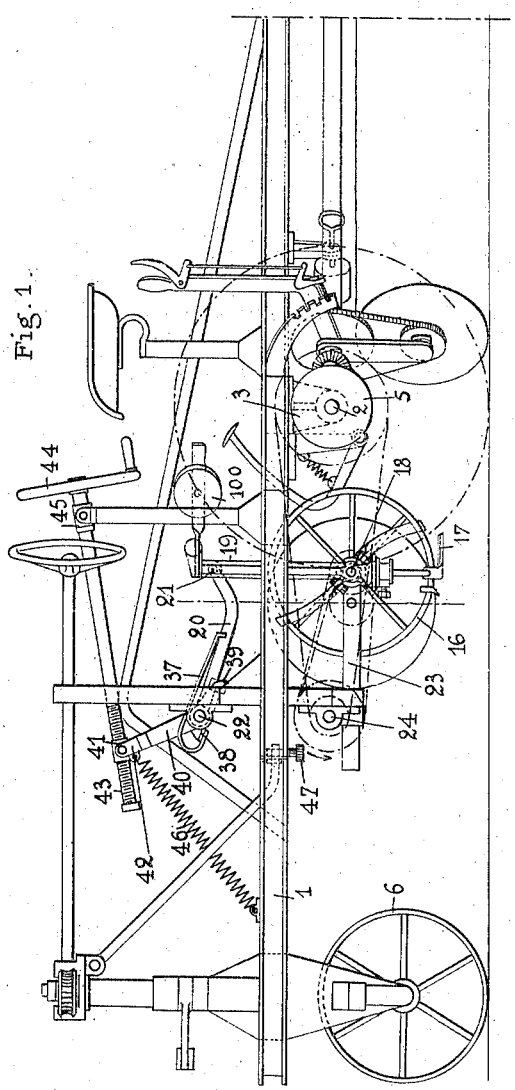
INVENTOR
EMILE DEGRÉMON

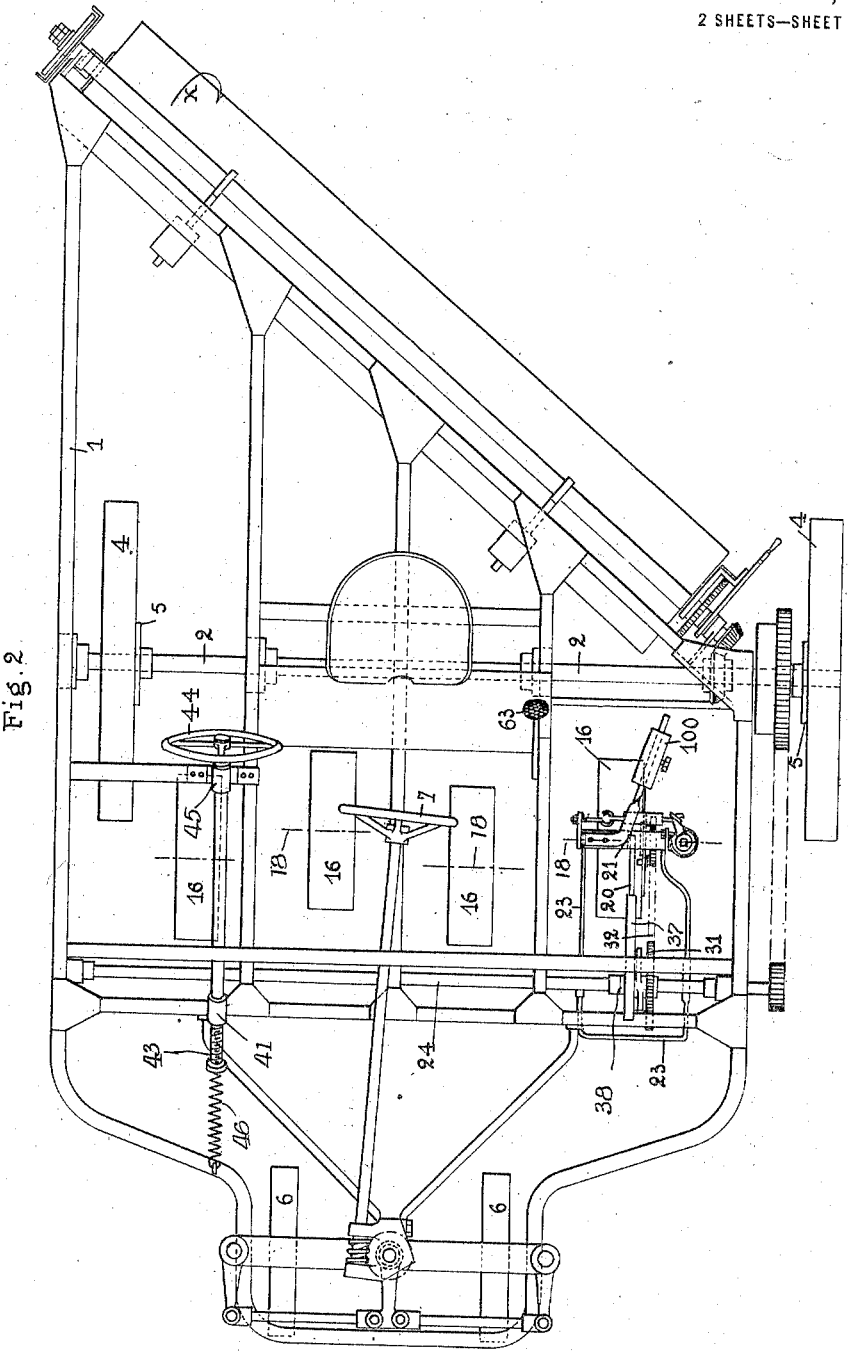

UNITED STATES PATENT OFFICE.

EMILE DEGRÉMONT, OF LE CATEAU, FRANCE.

FRAME FOR BEET-HARVESTING MACHINES.

1,249,911.  Specification of Letters Patent.  Patented Dec. 11, 1917.

Application filed August 21, 1913. Serial No. 785,940.

*To all whom it may concern:*

Be it known that I, EMILE DEGRÉMONT, a citizen of the Republic of France, and a resident of Le Cateau, Department of Nord, France, have invented certain new and useful Improvements in Frames for Beet-Harvesting Machines, of which the following is a specification.

The present invention relates to beet harvesting apparatus and particularly to the construction of the frame for carrying the harvesting apparatus.

In the accompanying illustrative embodiment of my invention,

Figure 1 is an elevation of a 4-row beet topper;

Fig. 2 is a plan thereof.

The machine here shown comprises a frame 1 of channel iron mounted through bearings 3 upon the rotating shaft 2. The latter is driven from the supporting wheels 4 through ratchet boxes 5 which permit the wheels to rotate at different speeds after the fashion of a differential when rounding curves. At the front the frame is supported by a pair of steering wheels 6.

This harvesting mechanism which may be of various types, is shown mounted on a shaft 18 fixed to a stirrup 19 which is here shown as carrying a beet top heading knife 17. The stirrup 19 is supported by an arm 20 pivoted to a pin 21 on the stirrup and to a shaft 22 rotating in bearings on the frame. The shaft 18 is also pivoted to another arm 23 freely mounted on a driving shaft 24 carried by the frame. The parts 18, 21 22 and 24 (see Fig. 1) constitute the angular points of a parallelogram which is flexible and the movable sides of which are formed by the stirrup 19 and arms 20 and 23, the side 24—22 being fixed and vertical. This arrangement allows the movable side 19 to always remain vertical which insures a constant grip for the knife 17 whatever the height thereof above the ground may be.

Each heading wheel 16 is borne downward not only by its own weight but also by the pressure of a flat spring 37 one end of which bears upon the lever 20 and the other end of which is fixed to a member 38 keyed on the shaft 22. This member 38 is provided with a lifting pawl 39 which engages beneath the arm 20. It will be understood that under these circumstances the pressure of the springs 37 upon the levers 20 can be regulated by the rotation of the shaft 22, and thus the pressure of the heading wheels upon the beet tops varied. Counterweights 100 fixed to stirrups 19 assist the action of the springs. The rotation of the shaft 22 also allows the heading wheels to be raised for the purpose of transport or when the machine has arrived at the end of the field. The rotation of the shaft 22 is obtained by means of a lever 40 keyed upon it and which carries a nut 41 pivoted in its forked end 42.

This nut 41 is screwed into the screw-threaded end of a shaft 43 provided with an operating hand wheel 44. This shaft is capable of rotating in a bearing 45 which is pivoted in its support. When the hand wheel 44 is rotated in the direction to raise the heading wheels 16, the shaft 22 rotates the members 38 and with these latter the springs 37, so that the pressure of these springs upon the arms 20 is removed. The lifting pawls 39 then lift the arms 20 and the stirrup 19 and the parts carried thereby are raised. A balancing spring 46 fixed to the end of the lever 42 and to the frame facilitates the lifting operation. The heading devices are brought back into their operative position by a reverse action. The tension of the springs 37 is obviously determined by the extent of rotation of the hand wheel 44. Adjustable screw stops 47 bear upon the end of the stirrups 23 and limit the descent of the heading wheels so that thereafter further rotation of the wheel 44 in the same direction increases the pressure exerted by the spring 37.

Various modifications of the construction shown will readily occur to those skilled in the art without departing from what I claim as my invention:—

I claim:—

1. In beet harvesting apparatus, a wheel supported frame, an upright rigid therewith, a second upright parallel thereto, links pivotally connecting said uprights to permit of a parallel-ruler motion of said second upright with relation to the fixed upright, a harvesting device carried at the lower end of said second upright, an operating hand screw, and a pawl operated thereby and engaging one of the link connections between said uprights to lift the movable upright carrying the harvesting tool.

2. In beet harvesting apparatus, a wheel supported frame, an upright rigid therewith, a second upright parallel thereto, links pivotally connecting said uprights to permit of a parallel-ruler motion of said second upright with relation to the fixed upright, a harvesting device carried at the lower end of said second upright, a spring adapted to exert downward pressure on one of said link connections, an operating hand screw and means operated thereby for forcing said spring downward into pressure-exerting position.

3. In beet harvesting apparatus, a wheel supported frame, an upright rigid therewith, a second upright parallel thereto, links pivotally connecting said uprights to permit of a parallel-ruler motion of said second upright with relation to the fixed upright, a harvesting device carried at the lower end of said second upright, a lifting pawl adapted to engage one of the link connections, a spring adapted to exert downward pressure on said link connection, a hand screw, and an operative connection between the same and said lifting pawl and pressure spring, for the purpose described.

4. In beet harvesting apparatus, a wheel supported frame, an upright rigid therewith, a second upright parallel thereto, links pivotally connecting said uprights to permit of a parallel-ruler motion of said second upright with relation to the fixed upright, a harvesting device carried at the lower end of said second upright, a lifting pawl adapted to engage one of the link connections, a spring adapted to exert downward pressure on said link connection, a hand screw, and an operative connection between the same and said lifting pawl and pressure spring, said connection being such that the lifting pawl is disengaged on the application of pressure from said spring, and the spring pressure is removed on the engagement of said lifting pawl, substantially as described.

5. In beet harvesting apparatus, a wheel supported frame, an upright rigid therewith, a second upright parallel thereto, links pivotally connecting said uprights to permit of a parallel-ruler motion of said second upright with relation to the fixed upright, a harvesting device carried at the lower end of said second upright, an operating hand screw, and a pawl operated thereby and engaging one of the link connections between said uprights to lift the movable upright carrying the harvesting tool, together with a lifting spring operatively connected to said lifting pawl, substantially as described.

6. In beet harvesting apparatus, a wheel supported frame, an upright rigid therewith, a second upright parallel thereto, links pivotally connecting said uprights to permit of a parallel-ruler motion of said second upright with relation to the fixed upright, a harvesting device carried at the lower end of said second upright, a spring adapted to exert downward pressure on one of said link connections, an operating hand screw and means operated thereby for forcing said spring downward into pressure-exerting position, together with an adjustable weight on said movable upright to assist the action of said pressure spring.

7. In beet harvesting apparatus, a wheel supported frame, an upright rigid therewith, a second upright parallel thereto, links pivotally connecting said uprights to permit of a parallel-ruler motion of said second upright with relation to the fixed upright, a harvesting device carried at the lower end of said second upright, a spring adapted to exert downward pressure on one of said link connections, an operating hand screw and means operated thereby for forcing said spring downward into pressure-exerting position, together with a stop limiting the downward movement of the movable upright whereby the pressure of said spring may be increased.

In testimony whereof I have signed my name in the presence of two subscribing witnesses.

EMILE DEGRÉMONT.

Witnesses:
JACQUES LEJEUNE,
LÉON TEILLER.

Copies of this patent may be obtained for five cents each, by addressing the "Commissioner of Patents, Washington, D. C."